US010044502B2

(12) United States Patent
Jain et al.

(10) Patent No.: US 10,044,502 B2
(45) Date of Patent: Aug. 7, 2018

(54) DISTRIBUTED VPN SERVICE

(71) Applicant: Nicira, Inc., Palo Alto, CA (US)

(72) Inventors: Jayant Jain, Cupertino, CA (US);
Anirban Sengupta, Saratoga, CA (US);
Uday Masurekar, Sunnyvale, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 14/815,074

(22) Filed: Jul. 31, 2015

(65) Prior Publication Data
US 2017/0033924 A1 Feb. 2, 2017

(51) Int. Cl.
H04L 29/06 (2006.01)
H04L 9/08 (2006.01)
G06F 9/455 (2018.01)
H04L 12/46 (2006.01)
H04L 12/24 (2006.01)

(52) U.S. Cl.
CPC ........ H04L 9/0819 (2013.01); G06F 9/45558 (2013.01); H04L 12/4633 (2013.01); H04L 12/4641 (2013.01); H04L 63/0218 (2013.01); H04L 63/0272 (2013.01); H04L 63/06 (2013.01); H04L 41/0803 (2013.01)

(58) Field of Classification Search
CPC . H04L 63/02; H04L 63/0272; H04L 63/0218; H04L 63/0428; H04L 63/06
See application file for complete search history.

(56) References Cited

U.S. PATENT DOCUMENTS

| 5,268,962 | A | 12/1993 | Abadi et al. |
| 6,738,910 | B1 | 5/2004 | Genty et al. |
| 7,055,027 | B1 | 5/2006 | Gunter et al. |
| 7,165,175 | B1 | 1/2007 | Kollmyer et al. |
| 7,380,124 | B1 | 5/2008 | Mizell et al. |
| 7,900,250 | B1 * | 3/2011 | Fedyk .................. H04L 9/0833 380/30 |
| 9,246,876 | B1 | 1/2016 | Melam et al. |
| 9,699,030 | B1 | 7/2017 | Kumar |
| 2002/0042875 | A1 * | 4/2002 | Shukla ............. H04L 29/12009 713/151 |
| 2002/0169980 | A1 | 11/2002 | Brownell |
| 2003/0079121 | A1 | 4/2003 | Gilman et al. |

(Continued)

OTHER PUBLICATIONS

International Search Report and Written Opinion issued in PCT Application No. PCT/US2016/044566, dated Sep. 28, 2016, 13 pages. (Year: 2016).*

(Continued)

Primary Examiner — Edward Zee
(74) Attorney, Agent, or Firm — Adeli LLP

(57) ABSTRACT

For a network that includes host machines for providing computing and networking resources and a VPN gateway for providing external access to those resources, a novel method that distributes encryption keys to the hosts to encrypt/decrypt the complete payload originating/terminating at those hosts is described. These encryption keys are created or obtained by the VPN gateway based on network security negotiations with the external networks/devices. These negotiated keys are then distributed to the hosts via control plane of the network. In some embodiments, this creates a complete distributed mesh framework for processing crypto payloads.

20 Claims, 12 Drawing Sheets

(56) References Cited

U.S. PATENT DOCUMENTS

| | | |
|---|---|---|
| 2003/0093691 A1* | 5/2003 | Simon ............... H04L 63/0428 726/4 |
| 2004/0143758 A1 | 7/2004 | Swander et al. |
| 2004/0225895 A1 | 11/2004 | Mukherjee et al. |
| 2005/0021949 A1 | 1/2005 | Izawa et al. |
| 2006/0090074 A1 | 4/2006 | Matoba |
| 2008/0075088 A1 | 3/2008 | Carrasco |
| 2008/0307519 A1 | 12/2008 | Curcio et al. |
| 2009/0059837 A1 | 3/2009 | Kurk et al. |
| 2010/0034207 A1 | 2/2010 | Mcgrew et al. |
| 2010/0077204 A1 | 3/2010 | Kawano |
| 2011/0185398 A1 | 7/2011 | Kubota |
| 2012/0039337 A1 | 2/2012 | Jackowski et al. |
| 2012/0096269 A1* | 4/2012 | McAlister ............ H04L 63/061 713/171 |
| 2013/0266019 A1 | 10/2013 | Qu et al. |
| 2014/0082719 A1 | 3/2014 | Persson et al. |
| 2014/0115325 A1* | 4/2014 | Detienne ............ H04L 63/0209 713/160 |
| 2014/0156818 A1 | 6/2014 | Hunt |
| 2014/0208317 A1 | 7/2014 | Nakagawa |
| 2014/0294018 A1 | 10/2014 | Sung et al. |
| 2014/0376550 A1 | 12/2014 | Khan et al. |
| 2015/0009992 A1 | 1/2015 | Zhang |
| 2015/0023357 A1 | 1/2015 | Imai |
| 2015/0124828 A1 | 5/2015 | CJ et al. |
| 2015/0146733 A1 | 5/2015 | Haney |
| 2015/0244617 A1 | 8/2015 | Nakil et al. |
| 2015/0281099 A1 | 10/2015 | Banavalikar |
| 2015/0358232 A1 | 12/2015 | Chen et al. |
| 2015/0372928 A1 | 12/2015 | Basilier et al. |
| 2015/0381386 A1 | 12/2015 | Sigoure et al. |
| 2016/0094365 A1 | 3/2016 | Subramaniyam et al. |
| 2016/0253198 A1 | 9/2016 | Gallant et al. |
| 2016/0359811 A1 | 12/2016 | Chan et al. |
| 2016/0380893 A1 | 12/2016 | Chopra et al. |
| 2017/0034129 A1 | 2/2017 | Sawant et al. |
| 2017/0170989 A1 | 6/2017 | Sridhar et al. |
| 2018/0062992 A1 | 3/2018 | Cohn et al. |

OTHER PUBLICATIONS

Cheswick, William R., et al., "Firewalls and Internet Security, Second Edition", Jan. 1, 2007, pp. 233-242, 318-325, Addison-Wesley, USA.

* cited by examiner

DISTRIBUTED VPN SERVICE

BACKGROUND

L2 and L3 VPN (Virtual Private Networks) are common networking constructs in today's networking deployments focused on extending reachable network beyond the traditional datacenter boundaries in a secure fashion. As the evolution of a distributed multi-site Datacenter becomes a reality and as the capacity of services offered increases, the traditional appliance based choked point L2 and L3 encryption services fail to meet the scale characteristics desired by such deployments. As multi-site datacenters become more prevalent, the need to stitch the secure traffic moving across these sites in a more seamless and scalable way is becoming critical.

For example, a VPN gateway installed on the perimeter of an enterprise internal network facing the Internet allows for external networks (or devices) to connect into the network via a tunneling mechanism over SSL/DTLS or IKE/IPSec. All traffic between such networks has to go through tunnel endpoints. The tunneling endpoints encrypt the traffic for forwarding and decrypt the incoming packet and feed it into their respective networks. Routing and policy based forwarding (PBF) directs the relevant traffic from the internal network to a local tunnel end point for forwarding, wherein it is further processed using bridging or PBF to find the right tunnel to the remote network.

In addition to tunneling operations, an enterprise network also has to perform crypto operations at its perimeter when providing VPN services. Crypto operations are fairly heavy weight in terms of resources, apart from PBF and bridging lookups. As the traffic demand increases at the perimeter, often the only solution is to invest in more dedicated and specialized hardware for running VPN services.

With overlays like VXLAN being used within the datacenter boundaries to facilitate network virtualization, the topology of the remote network is also not visible to the local network, and hence the perimeter edge has to strip the overlay header on its way out and attach it on its way in. Hence a seamless stitching of a multisite datacenter becomes more burdensome on the edge device doing this task.

SUMMARY

For a network that includes host machines for providing computing and networking resources and a VPN gateway for providing external access to those resources, some embodiments distribute encryption keys to the hosts to encrypt/decrypt the complete payload originating/terminating at those hosts. In some embodiments, these encryption keys are created or obtained by the VPN gateway based on network security negotiations with the external networks/devices. In some embodiments, these negotiated keys are then distributed to the hosts via control plane of the network. In some embodiments, this creates a complete distributed mesh framework for processing crypto payloads.

In some embodiments, a datacenter is deployed across multiple sites in separate physical locales, and these different sites are communicatively interlinked through the Internet. In some embodiments, each physical site is regarded as a datacenter and the different datacenters or sites are interlinked through the Internet to provide a multi-site environment. Some embodiments use VPN communications to conduct traffic securely between the different sites through the Internet. In some embodiments, each of the sites has an edge node interfacing the Internet, and the VPN connection between the different sites are encrypted by encryption keys negotiated between the edge nodes of different sites. The host machines in those sites in turn use the negotiated keys to encrypt and/or decrypt the data for VPN communications.

In some embodiments, each edge node is responsible for both negotiating encryption keys as well as handling packet forwarding. In some embodiments, one set of edge nodes is responsible for handling encryption key negotiation, while another set of edge nodes serves as VPN tunnel switch nodes at the perimeter for handling the mapping of the outer tunnel tags to the internal network hosts and for forwarding the packets to the correct host for processing, apart from negotiating the keys for the connection.

Some embodiments negotiate different encryption keys for different L4 connections, and each host machines running an applications using one of those L4 connections would use the corresponding flow-specific key to perform encryption. In some embodiments, when multiple different L4 connections are established by VPN, the VPN gateway negotiates a key for each of the flows such that the VPN gateway has keys for each of the L4 connections. In some of these embodiments, these keys are distributed to the host machines that are running applications that use the corresponding L4 connections. In some embodiments, a host machine obtain the key of a L4 connection from a controller of the datacenter when it query for resolution of destination address.

In addition to flow-specific VPN encryption keys, some embodiments also provide keys that are specific to individual L2 segments. In some embodiments, logical switches and logical routers can be global logical entities (global logical switch and global logical routers) that span multiple datacenters. In some embodiments, each global logical switch that spans multiple datacenter can have a VPN encryption key that is specific to its VNI (virtual network identifier, VLAN identifier, or VXLAN identifier for identifying a L2 segment). VMs operating in different sites but belonging to a same L2 segment (i.e., same global logical switch and same VNI) can communicate with each other using VPN connections that are encrypted by a VNI-specific key.

In some embodiments, the encryption keys used by the host machines to encrypt and decrypt VPN traffic are edge-negotiated keys. The edge as VPN gateway negotiates these keys according to security policies of the tenant or the logical network that is using the VPN connection, specific to a L4 connection or a L2 segment (logical switch). The controller then distributes negotiated keys to the host machines so the host machine performs the actual encryption and decryption. The edge is in turn tasked with forwarding the incoming encrypted VPN traffic to their rightful destinations.

In order to forward packets to their rightful destination within a datacenter, the edge in some embodiments uses the negotiated keys to decrypt at least a portion of each incoming VPN encrypted packet in order to reveal the destination of the encrypted packet. In some of these embodiments, the edge uses information in the header of the VPN encrypted packet to identify the corresponding decryption key and then use the identified key to decrypt and reveal the destination information of the packet.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

For a network that includes host machines for providing computing and networking resources and a VPN gateway for providing external access to those resources, some embodiments distribute encryption keys to the hosts to encrypt/decrypt the complete payload originating/terminating at those hosts. In some embodiments, these encryption keys are created or obtained by the VPN gateway based on network security negotiations with the external networks/devices. In some embodiments, these negotiated keys are then distributed to the hosts via control plane of the network. In some embodiments, this creates a complete distributed mesh framework for processing crypto payloads.

Figure 1:
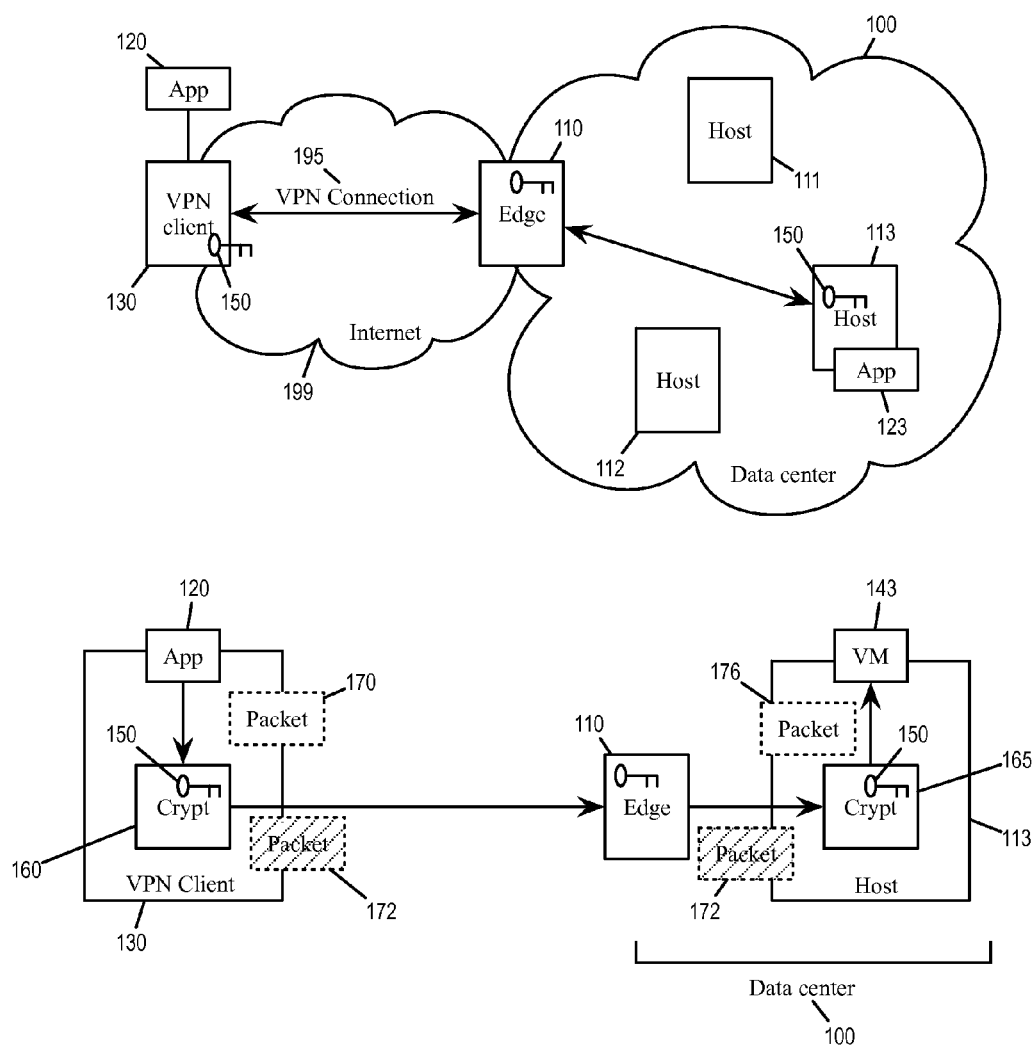
FIG. 1 illustrates a datacenter that provides VPN services to allow external access to its internal resources.

For some embodiments, FIG. 1 illustrates a datacenter 100 that provides VPN services to allow external access to its internal resources. A datacenter such as the datacenter 100 provides computing and/or networking resources to tenants or clients. The computing and/or network resources are logically organized into logical networks for different tenants, where the computing and networking resources are accessible or controllable as network nodes of these logical networks. In some embodiments, some the computing and network resources of the datacenter are provided by computing devices that serve as host machines for virtual machines (VMs). These VMs in turn perform various operations, including running applications for tenants of the datacenter. As illustrated, the datacenter 100 includes host machines 111-113. The host machine 113 in particular is hosting a VM that is running an application 123. The datacenter 100 also has an edge node 110 for providing edge services and for interfacing the external world through the Internet 199. In some embodiments, a host machine in the datacenter 100 is operating a VM that implements the edge node 110. (Computing devices that serve as host machines will be further described by reference to FIG. 10 below.)

Devices external to the datacenter 100 can access the resources of the datacenter (e.g., by appearing as a node in a network of the datacenter 100) by using the VPN service provided by the datacenter 100, where the edge 110 is serving as the VPN gateway for the datacenter 100. In the illustrated example, a device external to the datacenter 100 is operating an application 120. Such a device can be a computer, a smart phone, or any other device capable of secure data communicating with the datacenter. The application 120 is in VPN communication with the datacenter 100 over the Internet. The VPN communication is provided by a VPN connection 195 established over the Internet between a VPN client 130 and the edge node 110. The VPN connection 195 allows the application 120 to communicate with the application 123, even though the application 120 is running on a device external to the datacenter 100 while the application 123 is running on a host machine internal to the datacenter 100. The VPN connection 195 is a secured, encrypted connection over the Internet 199. The encryption protects the data traffic over the Internet 199 when it travels between the VPN client 130 and the edge 110.

In some embodiments, an edge node (such as 110) as a VPN gateway of a datacenter allows for external networks or devices to connect into the network via a tunneling mechanism over SSL/DTLS or IKE/IPSec. Traffic between such networks go through tunnel endpoints in some embodiments. The tunneling endpoints encrypt the traffic for forwarding and decrypt the incoming packet and feed it into their respective networks. Routing and policy based forwarding (PBF) directs the relevant traffic from the internal network to a local tunnel end point for forwarding, wherein it is further processed using bridging or PBF to find the right tunnel to the remote network.

The encryption of the VPN connection 195 is based on a key 150 that is negotiated by the edge 110 and the VPN client 130. In some embodiments, the edge negotiates such a key based on the security policies that is applicable to the data traffic (e.g., based on the flow/L4 connection of the packets, or based on L2 segment/VNI of the packets). The VPN client 130 uses this key 150 to encrypt and decrypt data to and from the VPN connection 195 for the application 120. Likewise, the host machine 113 uses the key 150 to encrypt and decrypt data to and from the VPN connection 195 for the application 123. As illustrated, the application 120 produces a packet 170. A crypto engine 160 in the VPN client 130 encrypts the packet 170 into an encrypted packet 172 by using the encryption key 150. The encrypted packet 172 travels through the Internet to reach the edge 110 of the datacenter 100. The edge 110 forwards the encrypted packet 172 to the host machine 113 by e.g., routing and/or encapsulating the encrypted packet. The host machine 113 has a crypto engine 165 that uses the encryption key 150 to decrypt the routed encrypted packet 172 into a decrypted packet 176 for the VM 143, which is running the application 123.

It is worth emphasizing that the encryption and the decryption of traffic across VPN connection is conducted near the true endpoint of the VPN traffic, rather than by the edge node that negotiated the encryption key of the VPN connection. In the example of FIG. 1, the true endpoint of the VPN traffic across the VPN connection 195 are application 120 and the application 123. The application 123 is running on the host machine 113, and the encryption/decryption is handled at the host machine 113 rather than at the edge node 110 (which negotiated the encryption key 150). In some embodiments, the machines in the datacenter are operating virtualization software (or hypervisors) in order to operate virtual machines, and the virtualization software running on a host machine handles the encryption and the decryption of the VPN traffic for the VMs of the host machine. Having encryption/decryption handled by the host machines rather than by the edge has the advantage of freeing the edge node from having to perform encryption and decryption for all VPN traffic in and out of the datacenter. Performing end-to-end VPN encryption/decryption also provides higher level of security than performing encryption/decryption at the edge because the VPN packets remain encrypted from the edge all the way to the host machine (and vice versa).

FIG. 1 illustrates a VPN connection that is established between a datacenter's edge node and a VPN client. In some embodiments, a computing device that is running an application that requires VPN access to a datacenter also operates the VPN client in order for the application to gain VPN access into the datacenter. In the example of FIG. 1, a computing device external to the datacenter 100 is operating the VPN client 130 as well as the application 120 in order to establish the VPN connection 195.

In some embodiments, a datacenter is deployed across multiple sites in separate physical locales, and these different sites are communicatively interlinked through the Internet. In some embodiments, each physical site is regarded as a datacenter and the different datacenters or sites are interlinked through the Internet to provide a multi-site environment. Some embodiments use VPN communications to conduct traffic securely between the different sites through the Internet. In some embodiments, each of the sites has an edge node interfacing the Internet, and the VPN connection between the different sites are encrypted by encryption keys negotiated between the edge nodes of different sites. The host machines in those sites in turn use the negotiated keys to encrypt and/or decrypt the data for VPN communications.

Figure 2:
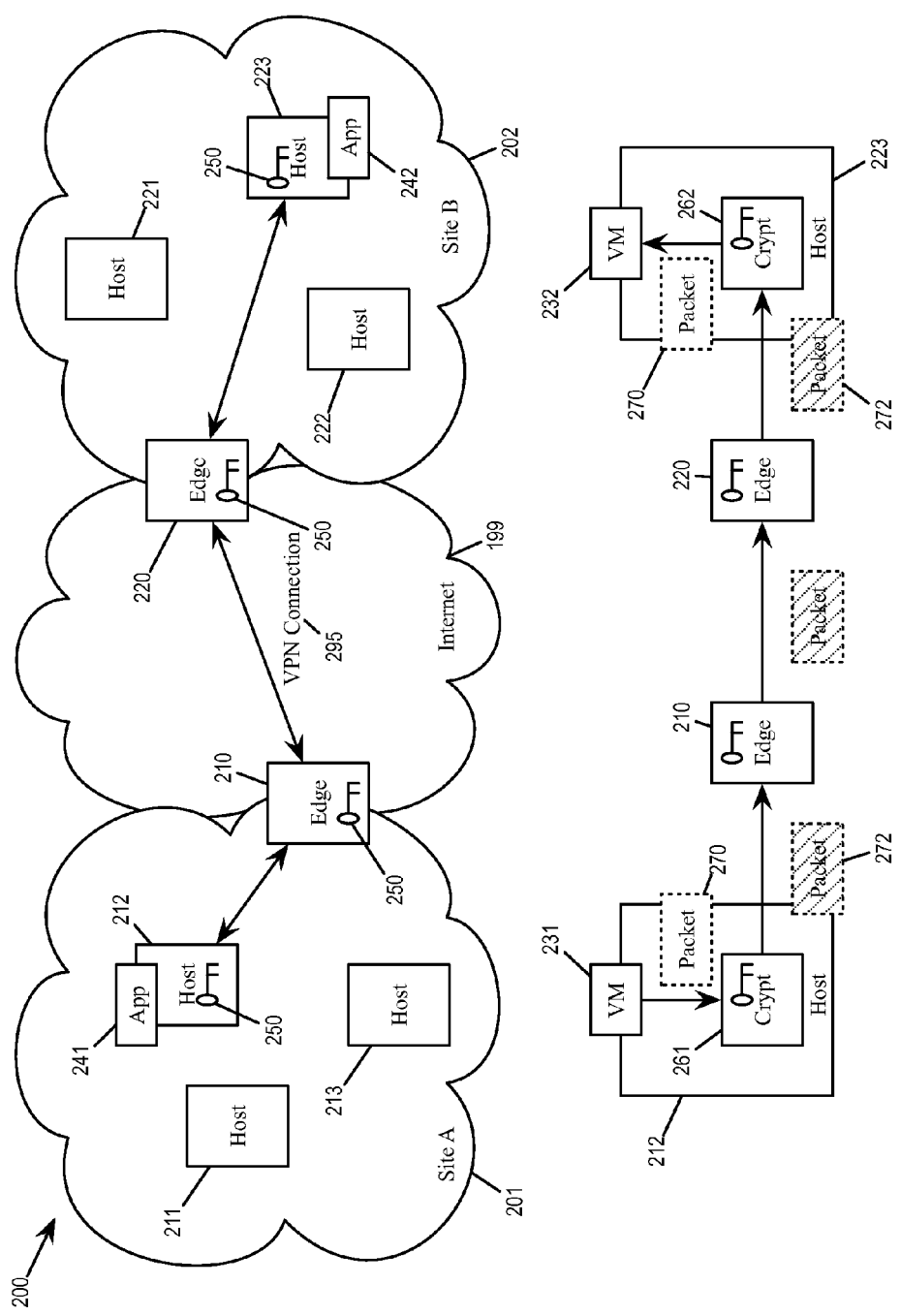
FIG. 2 illustrates a VPN connection between different sites in a multi-site environment.

FIG. 2 illustrates a VPN connection between different sites in a multi-site environment 200 (or multi-site datacenter). The multi-site environment 200 includes two sites 201 and 202 (site A and site B). The site 201 has host machines 211-213 and an edge node 210 for interfacing the Internet 199. The site 202 includes host machines 221-223 and an edge node 220 for interfacing the Internet 199. The edge nodes 210 and 220 serve as the VPN gateways for their respective sites.

The host machine 212 of site A is running an application 241 and the host machine 223 is running an application 242. The application 241 and the application 242 communicates with each other through a VPN connection 295 as the two applications 241 and 242 are running in different sites separated by the Internet 199. The VPN connection sends traffic that are encrypted by a key 250, which is the VPN encryption key negotiated between the edge 210 and the edge 220. Although the edge nodes 210 and 220 negotiated the key 250 for the VPN connection 295, the key 250 is provided to the host machines 212 and 223 so those host machines can perform the encryption/decryption for the VPN connection near the endpoints of the traffic (i.e., the applications 241 and 242).

As illustrated, a VM 231 of the host machine 212 produces a packet 270 (for the application 241). A crypto engine 261 in the host machine 212 encrypts the packet 270 into an encrypted packet 272 by using the encryption key 250. The host machine 212 forwards the encrypted packet 272 to the edge 210 of the site 201 by e.g., routing and/or encapsulating the packet. The edge 210 of site A in turn sends the encrypted packet 272 to the edge 220 of site B through the Internet (by e.g., using IPSec tunnel). The edge 220 forwards the encrypted packet 272 to the host machine to the host machine 223 by e.g., routing and/or encapsulating the encrypted packet. The host machine 223 has a crypto engine 262 that uses the encryption key 250 to decrypt the encrypted packet 272 into a decrypted packet 276 for a VM 232, which is running the application 223.

By performing VPN encryption/decryption at the host machines rather than at the edge, a datacenter or site is effectively implementing a distributed VPN system in which the tasks of implementing a VPN connection is distributed to the host machines from the edge node. In some embodiments, a site or datacenter has multiple edge nodes, and the VPN traffic to and from this site is further distributed among the different edge nodes.

Figure 3:
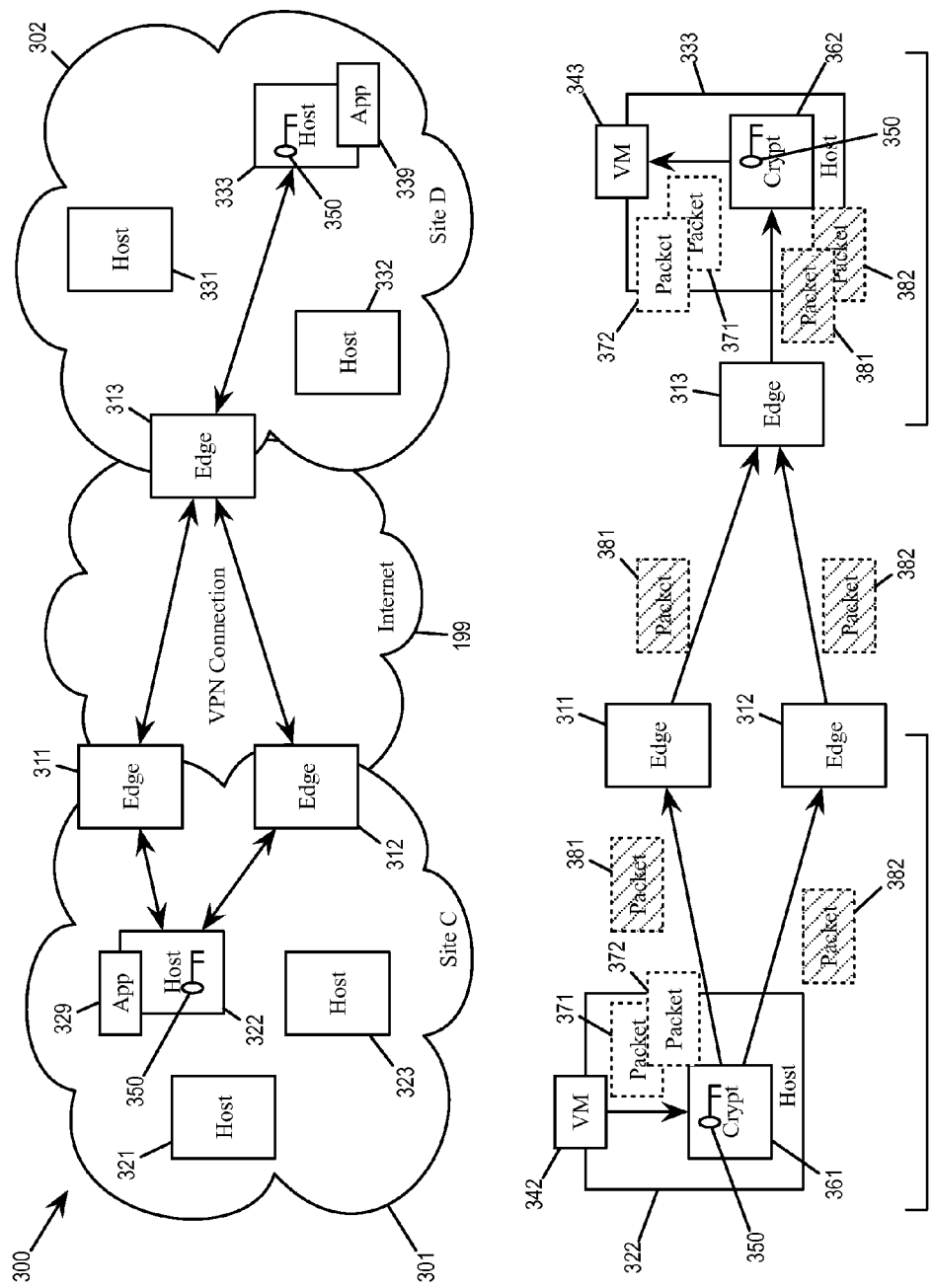
FIG. 3 illustrates the distribution of VPN traffic among multiple edge nodes in and out of a datacenter.

FIG. 3 illustrates the distribution of VPN traffic among multiple edge nodes in and out of a site/datacenter. The figure illustrates a multi-site environment 300 having sites 301 (site C) and 302 (site D). Site C has edge nodes 311 and 312 as well as host machines 321-323. Site D has an edge node 313 and host machines 331-333. The edge node 313 is serving as the VPN gateway for the site 302. Both edge nodes 311 and 312 are serving as VPN gateways for the site 301.

The host machine 322 of site C and the host machine 333 of site D are in VPN communication with each other for an application 329 running on the host machine 322 and an application 339 running in the host machine 333. The encryption/decryption of the VPN traffic is performed by the host machines 322 and 333 and based on a key 350 that is negotiated between the edge nodes 311, 312 and 313. The encrypted VPN traffic entering and leaving site D is only through the edge node 313, while the same traffic entering and leaving site C is distributed among the edge nodes 311 and 312.

As illustrated, a VM 342 running on the host machine 322 of site C generates packets 371 and 372 for the application 329. A crypto engine 361 of the host machine 322 encrypts these two packets into encrypted packets 381 and 382 using the encryption key 350. The encrypted packet 381 exits site C through the edge 311 into the Internet while the encrypted packet 382 exits site C through the edge 312 into the Internet. Both the encrypted packet 381 and 382 reaches site D through the edge 313, which forwards the encrypted packet to the host machine 333. The host machine 333 has a crypto engine 362 that uses the key 350 to decrypt the packets 381 and 382 for a VM 343, which is running the application 339.

In some embodiments, each edge node is responsible for both negotiating encryption keys as well as handling packet forwarding. In some embodiments, one set of edge nodes is responsible for handling encryption key negotiation, while another set of edge nodes serves as VPN tunnel switch nodes at the perimeter for handling the mapping of the outer tunnel tags to the internal network hosts and for forwarding the packets to the correct host for processing, apart from negotiating the keys for the connection.

Some embodiments negotiate different encryption keys for different L4 connections (also referred to as flows or transport sessions), and each host machines running an applications using one of those L4 connections would use the corresponding flow-specific key to perform encryption. Consequently, each host machine only need to perform VPN decryption/encryption for the L4 connection/session that the host machine is running.

Figure 4:
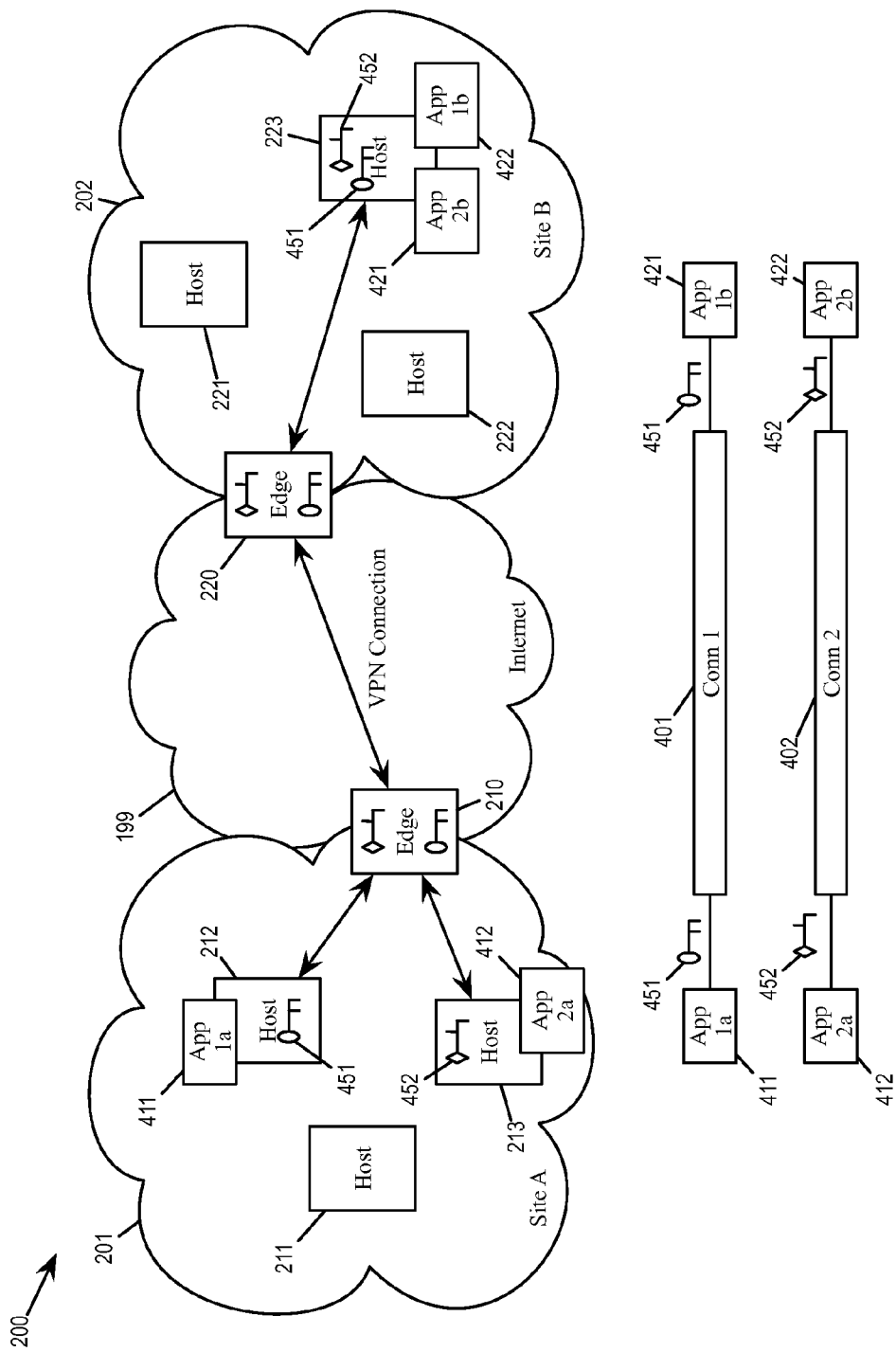
FIG. 4 illustrates host machines in multi-site environment performing flow-specific VPN encryption and decryption.

FIG. 4 illustrates host machines in multi-site environment performing flow-specific VPN encryption and decryption. Specifically, the figure illustrates a multi-site environment having established multiple L4 connections across different sites using VPN, where different encryption keys encrypt VPN traffic for different flows.

As illustrated, the multi-site environment 200 has established two L4 connections (or flows) 401 and 402. In some embodiments, each L4 connection is identifiable by a five-tuple identifier of source IP address, destination IP address, source port, destination port, and transport protocol. The L4 connection 401 ("conn 1") is established for transporting data between an application 411 ("app 1a") and an application 421 ("app 1b"). The connection 402 ("conn 2") is established for transporting data between an application 412 ("app 2a") and an application 422 ("app 2b"). The applications 411 is running in the host machine 212 and the application 412 is running in the host machine 213, while both applications 421 and 422 are running in site B at the host machine 223.

Since both L4 connections 401 and 402 are inter-site connections that require VPN encryption across the Internet, the VPN gateways of each site has negotiated keys for each of the L4 connections. Specifically, the VPN traffic of L4 connection 401 uses a key 451 for VPN encryption, while the VPN traffic of L4 connection 402 uses a key 452 for VPN encryption.

As the host machine 212 is running an application (the application 411) that uses the flow 401, it uses the corresponding key 451 to encrypt/decrypt VPN traffic for the flow 401. Likewise, as the host machine 213 is running an application (the application 412) that uses the flow 402, it uses the corresponding key 452 to encrypt/decrypt VPN traffic for the flow 402. The host machine 223 is running applications for both the flows 401 and 402 (i.e., applications 421 and 422). It therefore uses both the key 451 and 452 for encrypting and decrypting VPN traffic (for flows 401 and 402, respectively).

As mentioned, VPN encryption keys are generated based on the negotiation between the VPN gateways (i.e., edge nodes of datacenters/sites). In some embodiments, when multiple different L4 connections are established by VPN, the VPN gateway negotiates a key for each of the flows such that the VPN gateway has keys for each of the L4 connections. In some of these embodiments, these keys are then distributed to the host machines that are running applications that use the corresponding L4 connections. In some embodiments, a host machine obtain the key of a L4 connection from a controller of the datacenter when it query for resolution of destination address (e.g., performing ARP operations for destination IP address.)

Figure 5A:
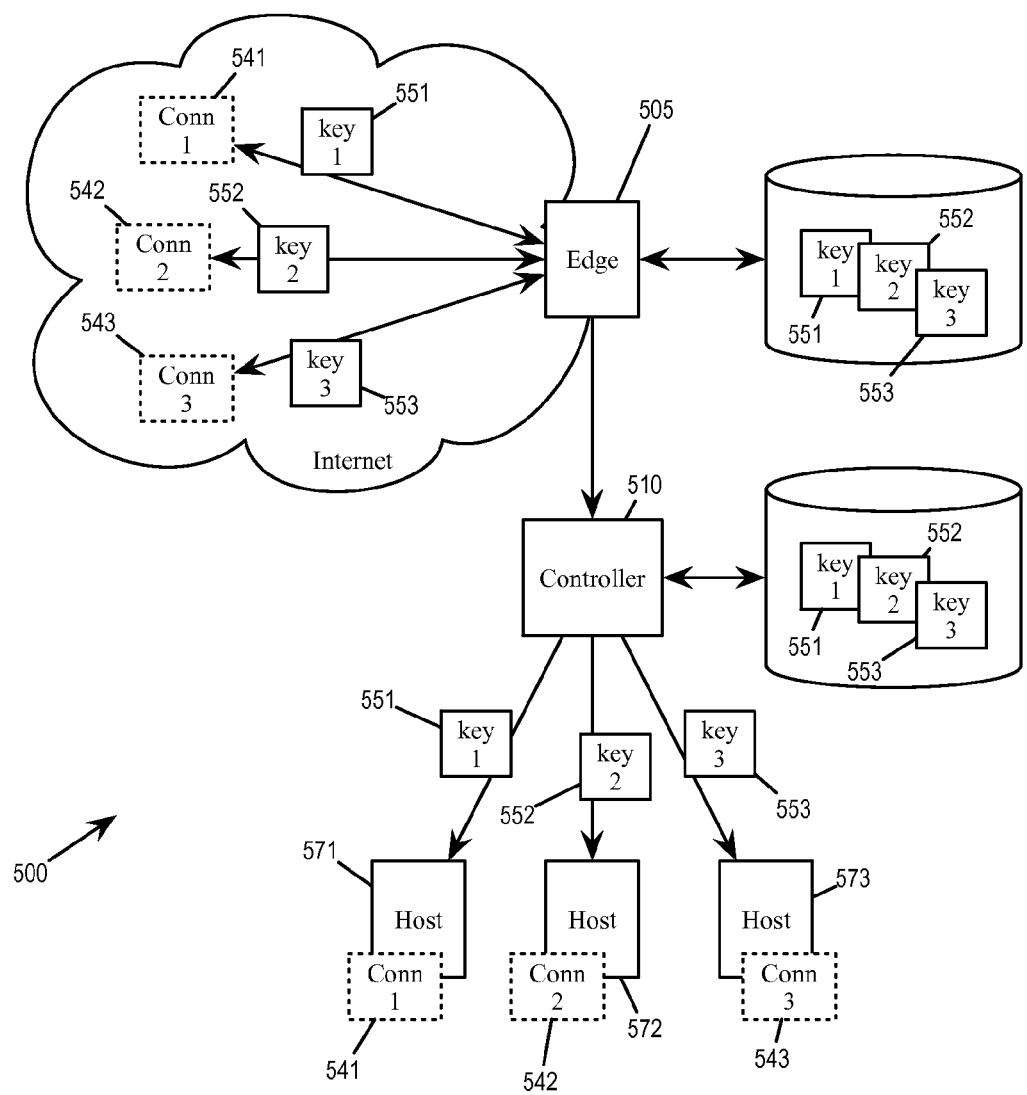
FIGS. 5a-b conceptually illustrate the distribution of VPN encryption keys from an edge to host machines through control plane.
Figure 5B:
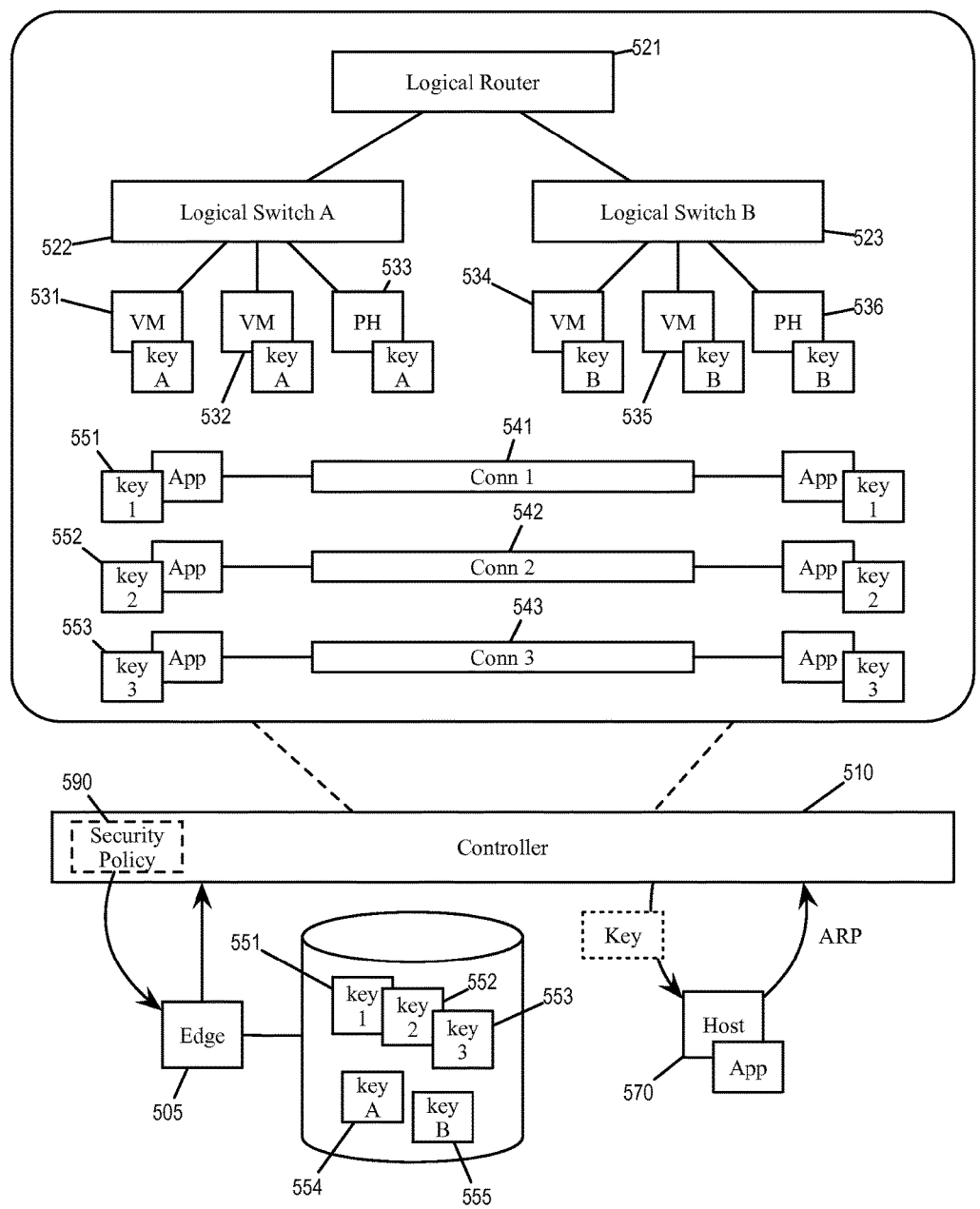

FIGS. 5a-b conceptually illustrate the distribution of VPN encryption keys from an edge to host machines through control plane. The figure illustrates a datacenter 500 having several host machines 571-573 as well as an edge 505 (or multiple edges) that interfaces the Internet and serves as a VPN gateway for the datacenter. The datacenter 500 also has a controller (or a cluster of controllers) 510 for controlling the operations of the host machines 571-573 and the edge 505.

The datacenter 500 is also implementing a logical network 520 that includes a logical router 521 for performing L3 routing as well as logical switches 522 and 523 for performing L2 routing. The logical switch 522 is for performing L2 switching for a L2 segment that includes VMs 531-533. The logical switch 523 is for performing L2 switching for a L2 segment that includes VMs 534-536. In some embodiments, these logical entities are implemented in a distributed fashion across host machines of the datacenter 500. The operations of distributed logical routers and switches, including ARP operations in a virtual distributed router environment, are described in U.S. patent application Ser. No. 14/137,862 filed on Dec. 20, 2013, titled "Logical Router", published as U.S. Patent Application Publication 2015/0106804. The controller 510 controls the host machines of the datacenter 500 in order for those host machines to jointly implement the logical entities 521-523.

As illustrated, the datacenter has several on going L4 connections (flows) 541-543 ("Conn 1", "Conn 2", and "Conn 3"), and the edge 505 has negotiated keys 551-553 for these flows with remote devices or networks external to the datacenter 500. The edge 505 negotiates the keys 551-553 for these flows and stores the negotiated keys 551-553 at the edge 505. In some embodiments, these keys are distributed to those host machines by the controller 510. As illustrated in FIG. 5a, the host machines 571-572 are respectively running applications for L4 connections (flows) 541-543, and the controller distributes corresponding keys 551-553 of those flows to the host machines 571-573.

In addition to flow-specific VPN encryption keys, some embodiments also provide keys that are specific to individual L2 segments. In some embodiments, logical switches and logical routers can be global logical entities (global logical switch and global logical routers) that span multiple datacenters. In some embodiments, each global logical switch that spans multiple datacenter can have a VPN encryption key that is specific to its VNI (virtual network identifier, VLAN identifier, or VXLAN identifier for identifying a L2 segment). VMs operating in different sites but belonging to a same L2 segment (i.e., same global logical switch and same VNI) can communicate with each other using VPN connections that are encrypted by a VNI-specific key. As illustrated in FIG. 5b, the logical switch 522 (switch A) has a corresponding VPN encryption key 554 (key A) and the logical switch 523 (switch B) has a corresponding VPN encryption key 555 (key B). These keys are also stored at the edge 505 and can be retrieved by host machines that queries for them.

As illustrated, a host machine 570 in the datacenter 500 is operating in the datacenter 500 and controlled by the controller 510 through control plane messages. Depending on the application that it has to run (on the VMs that it is operating), the host machine 570 receives from the controller the corresponding VPN encryption keys. In some embodiments, the host machine receives encryption keys when it is trying to resolve destination IP addresses during ARP operations. The controller 510 would provide the encryption key to the host machine 570 when the queried destination IP is one that requires VPN encryption (i.e., a destination IP that is in another site separated from the local site). In some embodiments, such a key can be a flow-specific key. In some embodiments, such a key can be a VNI-specific key. In some embodiments, each key is negotiated for a policy instance 590 maintained at the controller 510. These policies in some embodiments establishes rules for each flow or for each VNI/L2 segment (e.g., the conditions for rejecting or accepting packets). The controller directs the edge to negotiate the keys based on these policies for certain flows or VNIs.

Figure 6:
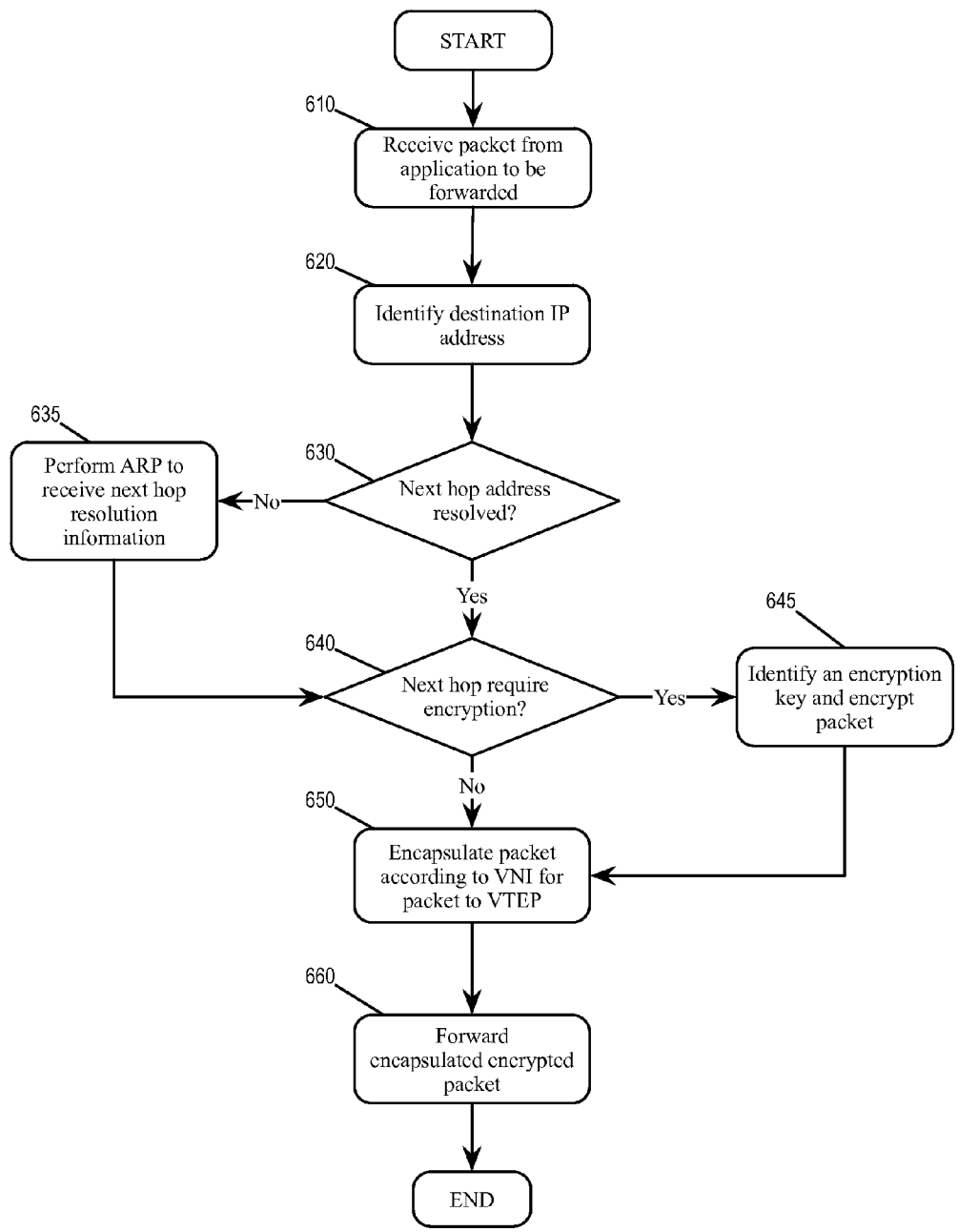
FIG. 6 conceptually illustrates a process that is performed by a host machine in a datacenter that uses VPN to communicate with external network or devices.

For some embodiments, FIG. 6 conceptually illustrates a process 600 that is performed by a host machine in a datacenter that uses VPN to communicate with external network or devices. The process 600 starts when it receives (at 610) an outgoing packet to be forwarded from an application running on a VM.

The process then identifies (at 620) the destination IP address of the outgoing packet and determines (at 630) whether the destination IP address need to be resolved, i.e., whether the next hop based on the destination IP address is known. In some embodiments, the next hop is identified by its VNI and MAC address. In some embodiments, the next hop is behind a virtual tunnel and the packet is to be forwarded according to a tunnel endpoint address (VTEP), which can corresponds to another host machine or physical router in the network. If the next hop address is already resolved, the process proceeds to 640. If the next hop address is not resolved, the process proceeds to 635.

At 635, the process performs ARP in order to receive the necessary address resolution information from the controller. Such information in some embodiments includes the VNI, the MAC address, and/or the VTEP of next hop. In some embodiments, such information also includes VPN encryption key if the data is to be transmitted via a VPN connection. In some embodiments, such information includes a remote network's topology using host tags so that the secure overlay traffic travels directly to host machines in the remote networks where the workload is located. The process then proceeds to 640.

At 640, the process determines if VPN encryption is necessary for the next hop. Some embodiments make this determination based on the earlier ARP response from 635, which informs the process whether packet has to be encrypted for VPN and provides a corresponding key if encryption is necessary. Some embodiments make this determination based on security policy or rules applicable to the packet. If the VPN encryption is necessary, the process proceeds to 645. Otherwise the process proceeds to 650.

At 645, the process identifies the applicable VPN encryption key and encrypts the packet. In some embodiments, the host machine may operate multiple VMs having applications requiring different encryption keys (e.g., for packets belonging to different flows or different L2 segments.) The process would thus use information in packet (e.g., L4 flow identifier or L2 segment identifier) to identify the correct corresponding key. The process then proceeds to 650.

At 650, the process encapsulates the (encrypted) packet according to the resolved next hop information (i.e., the destination VTEP, MAC address, and VNI) so the packet can be tunneled to its destination. The process then forwards (at 660) the encapsulated packet to its destination, i.e., to the edge so the edge can forward the packet to the external device through the Internet. After forwarding the encapsulated packet, the process 600 ends.

As mentioned above by reference to FIGS. 1 and 2, in order to send data packets from its originating application/VM to its destination application/VM through VPN connection and tunnels, the packet has to go through a series of processing operations such as encryption, encapsulation, decryption, and de-capsulation. In some embodiments, when a packet is generated by an application at a particular datacenter or site, the host machine running the application encrypts the packet with VPN encryption key and then encapsulates the packet (using overlay such as VXLAN) in order to tunnel the to the edge. The edge in turn processes the packet into an IPSec packet with IPSec header. The IPSec packet is then sent through the Internet to another datacenter or site, with the content of the packet encrypted. The edge of the other site then tunnels the packet to its destination tunnel endpoint (a host machine) by encapsulating it (under overlay such as VXLAN). The host machine that receives the tunnel packet in turn de-capsulate the packet, decrypt the packet, and forward the decrypted data to the destination VM/application.

Figure 7:
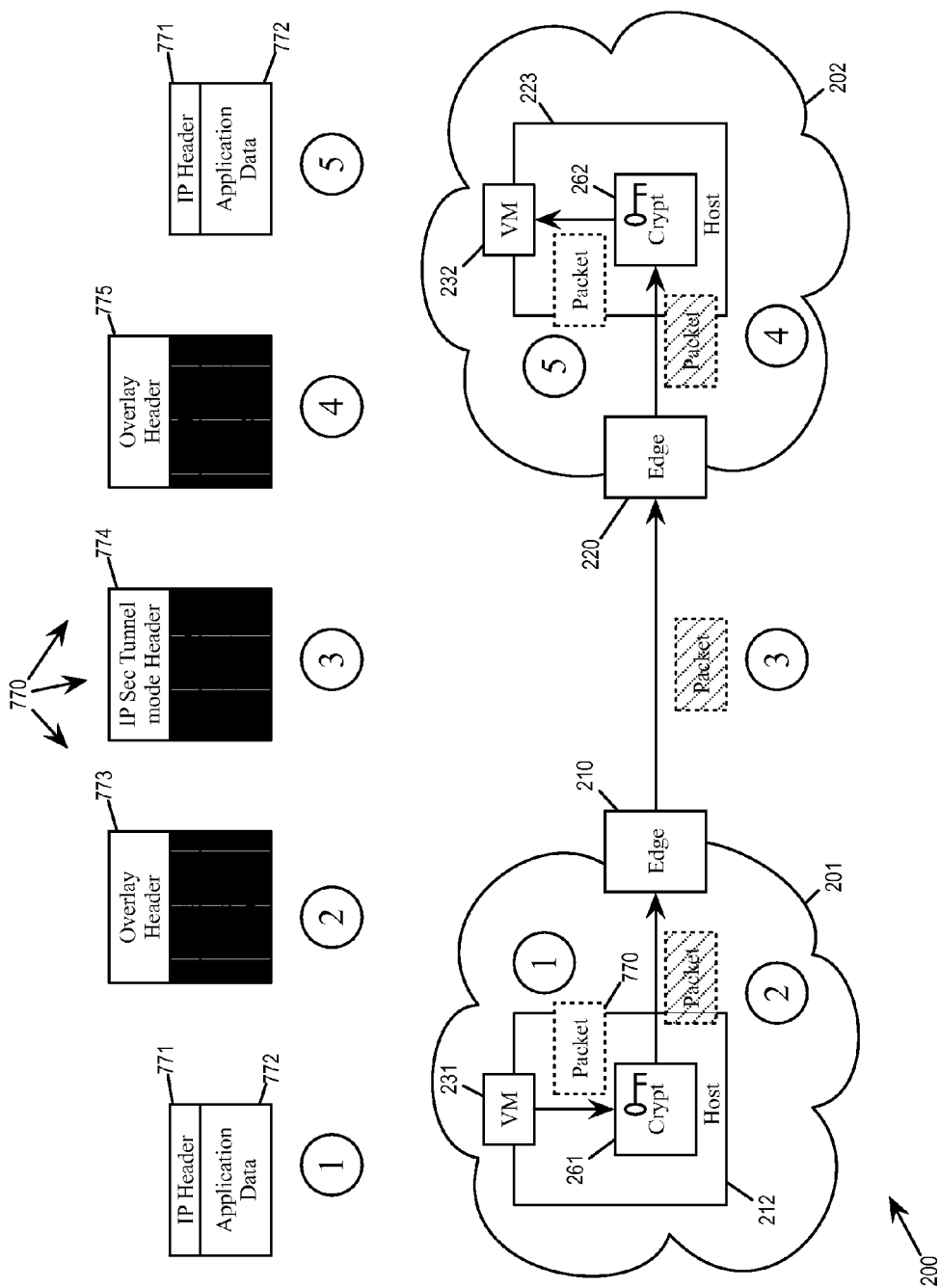
FIG. 7 illustrates packet-processing operations that take place along the data path when sending a packet from one site to another site by using VPN.

For some embodiment, FIG. 7 illustrates packet-processing operations that take place along the data path when sending a packet 770 from one site (the site 201) to another site (the site 202) by using VPN. The packet 770 originates at the VM 231 of the host machine 212, travels through the edge node 210 of site 201 and the edge node 220 of the site 202 to reach the host machine 223 and the VM 232.

The figure illustrates the packet 770 at five sequential stages labeled from '1' through '5'. At the first stage labeled '1', the VM 231 produces the packet 770, which includes the application data 771 and IP header data 772. In some embodiments, such header can includes destination IP address, source IP addresses, source port, destination port, source MAC address, and destination MAC address. The packet 770 is not encrypted at operation '1'. In some embodiments, the information in the IP header refers to topologies of the source datacenter (i.e., the site 201) that the security policy of the datacenter may not want to reveal, and hence the subsequent VPN encryption operations will encrypt the IP header as well as the application data.

At the second stage labeled '2', the host machine 212 has identified the applicable VPN encryption key for the packet 700 based on the content of the IP header 771 (e.g., by identifying the flow/L4 connection or by identifying the VNI/L2 segment). The host machine then encrypted the IP header 771 and well as the application data 772 (shown in hash). Furthermore, based on the information of the IP header 771, the host machine has encapsulated the packet 770 for an overlay logical network (e.g., VXLAN) with an overlay header 773 in order to tunnel the packet to the edge 210 of site 201.

At the third stage labeled '3', the edge 210 receives the tunneled packet and strips off the overlay header 773. The edge then creates an IPSec packet for transmission across the Internet. The IPSec packet includes an IPSec Tunnel Mode header 774 that is based on the information in the stripped off overlay header 773. This IPSec header 774 includes information that can be used to identify the VPN encryption key (e.g., in the SPI field of the IPSec header). The edge 210 then sends packet 770 (with the encrypted IP header 771, the encrypted application data 772, and their corresponding IPSec Tunnel Mode header 773) toward the edge 220 of the site 202.

At the fourth stage labeled '4', the edge 220 of the site 202 uses the information in the IPSec Tunnel Mode header to 773 to identify the key used for the encryption and decrypt enough of the IP header 771 in order to create an overlay header 775. This overlay header is for encapsulating the packet 770 (with encrypted IP header 771 and encrypted application data 772) for an overlay logical network (e.g., VXLAN). The edge then tunnels the encapsulated packet to the host machine 223.

At the fifth stage labeled '5', the host machine 223 strips off the overlay header 775 and decrypt the packet 770 (i.e., the IP header 771 and the application data 772) for delivery to the destination VM 232.

As mentioned, the encryption keys used by the host machines to encrypt and decrypt VPN traffic are edge-negotiated keys. The edge as VPN gateway negotiates these keys according to security policies of the tenant or the logical network that is using the VPN connection, specific to a L4 connection or a L2 segment (logical switch). The controller then distributes negotiated keys to the host machines so the host machine performs the actual encryption and decryption. The edge is in turn tasked with forwarding the incoming encrypted VPN traffic to their rightful destinations.

However, in order to forward packets to their rightful destination within a datacenter, the edge in some embodiments nevertheless has to use the negotiated keys to decrypt at least a portion of each incoming VPN encrypted packet in order to reveal the destination of the encrypted packet. This is necessary for some embodiments in which the identity of the destination (e.g., its VNI, MAC address, IP address, etc.) is in encrypted payload of a VPN encrypted packet. In some of these embodiments, the edge uses information in the header of the VPN encrypted packet to identify the corresponding decryption key and then use the identified key to decrypt and reveal the destination information of the packet.

Figure 8:
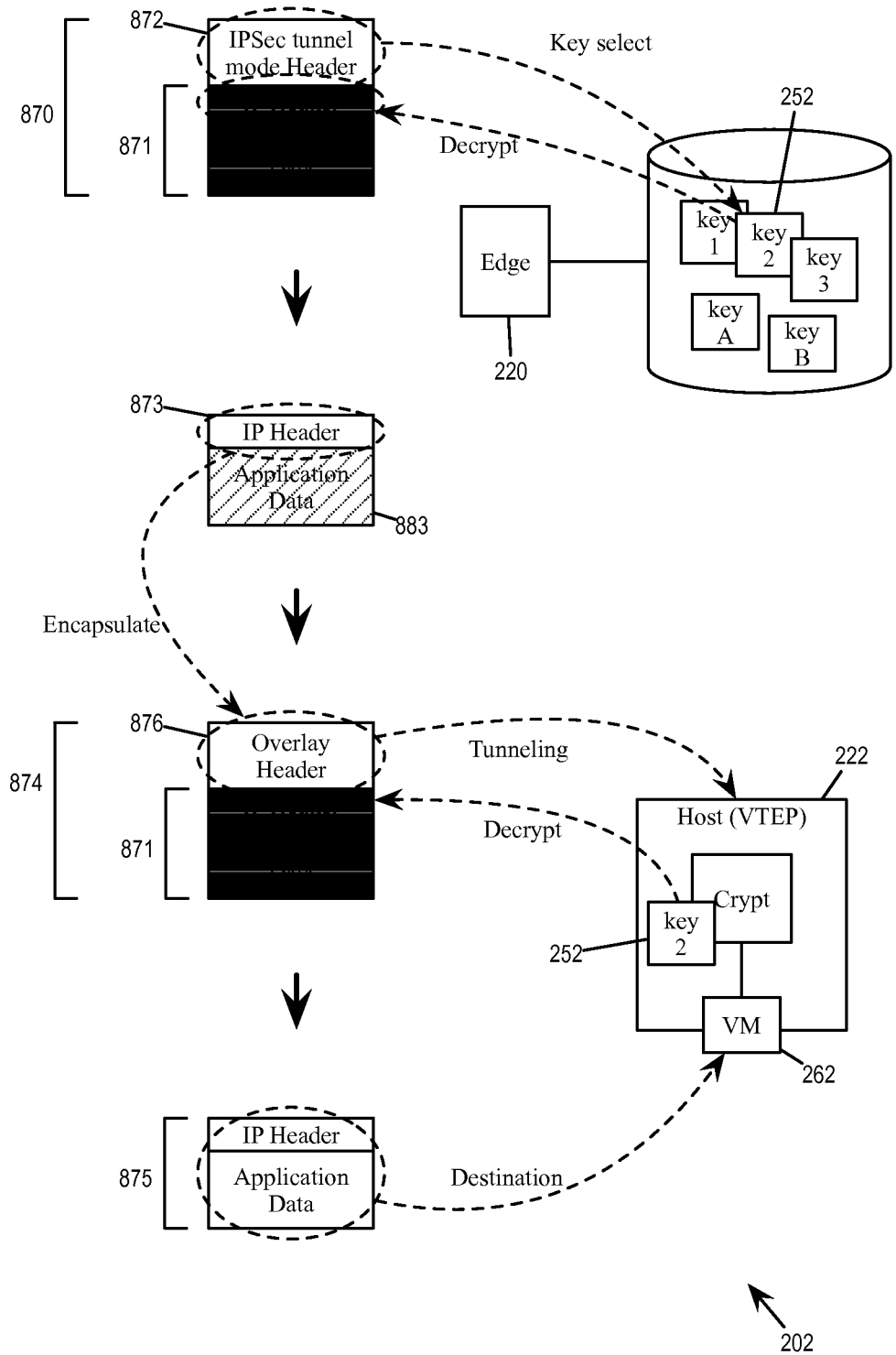
FIG. 8 illustrates using partial decryption of the VPN encrypted packet to identify the packet's rightful destination.

FIG. 8 illustrates using partial decryption of the VPN encrypted packet to identify the packet's rightful destination. The figure illustrates the forwarding of a VPN encrypted packet 870 by the edge 220 of the datacenter 202. The received VPN encrypted packet 870 is an IPSec packet arriving at the edge 220 from the Internet from another datacenter. As the packet 870 arrives at the edge 220, it has an encrypted payload 871 and an unencrypted IPSec header 872. The payload 871 includes both IP header 873 and application data 883.

Since the header 872 of the IPSec is an IPSec tunnel mode header that is not encrypted, it can be read directly by the edge 220. The IPSec tunnel mode header 872 includes field that identifies the flow or L4 connection that the packet 870 belongs to. In some embodiments in which the VPN encrypted packet is an IPSec packet, the SPI field of the IPSec header provides the identity of the flow. The edge 220 in turn uses the identity of the flow provided by the IPSec header to select/identify a corresponding encryption key 252.

The edge 220 in turn uses the identified key 252 to decrypt a portion of the encrypted payload 871 of the packet 870, revealing the first few bytes (e.g., the header portion) 873 of the payload. In some embodiment, the edge 220 would halt the decryption operation once these first few bytes are revealed in some embodiments. Based on the revealed bytes, the edge determines the identity of the destination and encapsulates the encrypted payload 871 into an encapsulated packet 874 by adding an overlay header 876. In some embodiments, this encapsulation is for tunneling in overlay logical network such as VXLAN. The encapsulated packet 874 is tunneled to the destination host machine 222.

Once the encapsulated packet 874 reaches the host machine 222, the host machine uses the VPN encryption key 252 to decrypt the encrypted payload 871. If the host machine 222 does not have the key, it would perform an ARP like operation and queries the controller for the key based on either the VNI or the destination IP. The decryption results in a decrypted payload 875, which is provided to the destination VM 262.

Figure 9:
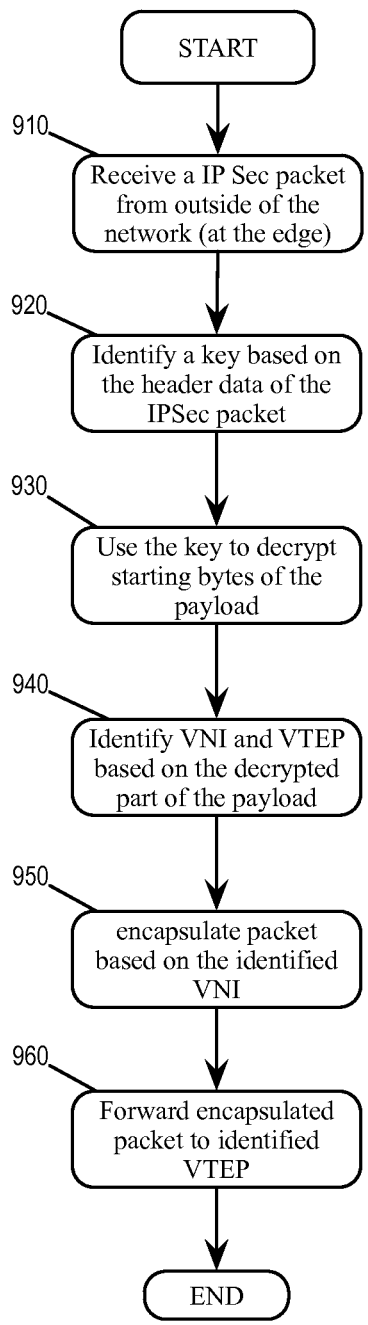
FIG. 9 conceptually illustrates a process for forwarding VPN encrypted packet at an edge node.

For some embodiments, FIG. 9 conceptually illustrates a process 900 for forwarding VPN encrypted packet at an edge node. In some embodiments, the process 900 is performed by an edge of the datacenter such as the edge node 220.

The process 900 starts when it receives (at 910) a packet from outside of the network/datacenter. In some embodiments, the payload of this packet is encrypted based on a VPN encryption key. In some embodiments, the packet is an IPSec packet.

Next, the process identifies (920) a VPN encryption key based on the header data of the packet. In some embodiments in which the packet is an IPSec packet, the header of the IPSec packet is not encrypted. Such a packet header in some embodiments includes information that can be used to identify VPN encryption key. In some embodiments, these indication includes the flow/L4 connection of the IPSec packet. Consequently, the process is able to identify the encryption key based on the indication provided by the header by e.g., using the flow identifier of the IPSec packet to identify the corresponding VPN encryption key.

The process then uses (930) the identified key to decrypt the starting bytes of the encrypted payload in order to reveal these bytes to the edge node. In some embodiments, the starting bytes of the encrypted payload include information that can be used to determine the next hop after the edge node, information such as destination IP address, destination VNI, destination VTEP, destination MAC address, etc. The process then uses the decrypted bytes to identify (at 940) the next hop information. In some embodiments, the process performs L3 routing operations based on the information in the revealed bytes (e.g., destination IP address) in order to identify the destination VNI, destination VTEP, or next hop MAC.

Next, the process encapsulates (950) packets based on the identified VNI. In some embodiments, the encrypted payload of the IPSec is encapsulated under VXLAN format based on the earlier identified information (e.g., destination VNI and VTEP).

The process then forwards (960) the encapsulated packet to the identified destination (e.g., a host machine as the VTEP). The process 900 then ends.

Figure 10:
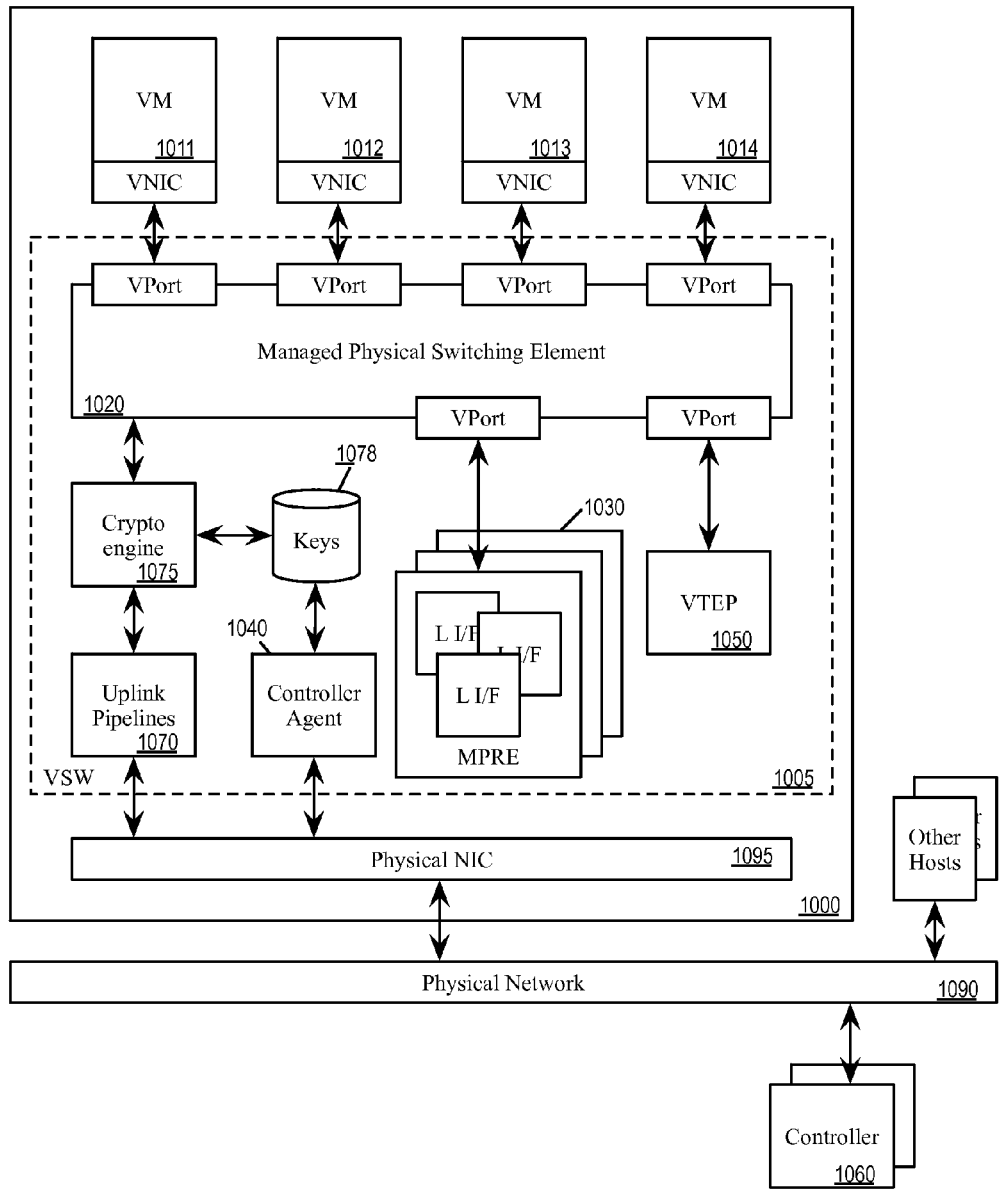
FIG. 10 illustrates a computing device that serves as a host machine.

FIG. 10 illustrates a computing device 1000 that serves as a host machine for some embodiments of the invention. The computing device 1000 is running virtualization software that implements a physical switching element and a set of physical routing elements. (i.e., MPSE and MPREs).

As illustrated, the computing device 1000 has access to a physical network 1090 through a physical NIC (PNIC) 1095. The host machine 1000 also runs the virtualization software 1005 and hosts VMs 1011-1014. The virtualization software 1005 serves as the interface between the hosted VMs and the physical NIC 1095 (as well as other physical resources, such as processors and memory). Each of the VMs includes a virtual NIC (VNIC) for accessing the network through the virtualization software 1005. Each VNIC in a VM is responsible for exchanging packets between the VM and the virtualization software 1005. In some embodiments, the VNICs are software abstractions of physical NICs implemented by virtual NIC emulators.

The virtualization software 1005 manages the operations of the VMs 1011-1014, and includes several components for managing the access of the VMs to the physical network (by implementing the logical networks to which the VMs connect, in some embodiments). As illustrated, the virtualization software includes several components, including a MPSE 1020, a set of MPREs 1030, a controller agent 1040, a VTEP 1050, a crypto engine 1075, and a set of uplink pipelines 1070.

The VTEP (VXLAN tunnel endpoint) 1050 allows the host machine 1000 to serve as a tunnel endpoint for logical network traffic (e.g., VXLAN traffic). VXLAN is an overlay network encapsulation protocol. An overlay network created by VXLAN encapsulation is sometimes referred to as a VXLAN network, or simply VXLAN. When a VM on the host 1000 sends a data packet (e.g., an ethernet frame) to another VM in the same VXLAN network but on a different host, the VTEP will encapsulate the data packet using the VXLAN network's VNI and network addresses of the VTEP, before sending the packet to the physical network. The packet is tunneled through the physical network (i.e., the encapsulation renders the underlying packet transparent to the intervening network elements) to the destination host. The VTEP at the destination host decapsulates the packet and forwards only the original inner data packet to the destination VM. In some embodiments, the VTEP module serves only as a controller interface for VXLAN encapsulation, while the encapsulation and decapsulation of VXLAN packets is accomplished at the uplink module 1070.

The controller agent 1040 receives control plane messages from a controller or a cluster of controllers. In some embodiments, these control plane message includes configuration data for configuring the various components of the virtualization software (such as the MPSE 1020 and the MPREs 1030) and/or the virtual machines. In the example illustrated in FIG. 10, the controller agent 1040 receives control plane messages from the controller cluster 1060 from the physical network 1090 and in turn provides the received configuration data to the MPREs 1030 through a control channel without going through the MPSE 1020. However, in some embodiments, the controller agent 1040 receives control plane messages from a direct data conduit (not illustrated) independent of the physical network 1090. In some other embodiments, the controller agent receives control plane messages from the MPSE 1020 and forwards configuration data to the router 1030 through the MPSE 1020.

The MPSE 1020 delivers network data to and from the physical NIC 1095, which interfaces the physical network 1090. The MPSE also includes a number of virtual ports (vPorts) that communicatively interconnects the physical NIC with the VMs 1011-1014, the MPREs 1030 and the controller agent 1040. Each virtual port is associated with a unique L2 MAC address, in some embodiments. The MPSE performs L2 link layer packet forwarding between any two network elements that are connected to its virtual ports. The MPSE also performs L2 link layer packet forwarding between any network element connected to any one of its virtual ports and a reachable L2 network element on the physical network 1090 (e.g., another VM running on another host). In some embodiments, a MPSE is a local instantiation of a logical switching element (LSE) that operates across the different host machines and can perform L2 packet switching between VMs on a same host machine or on different host machines. In some embodiments, the MPSE performs the switching function of several LSEs according to the configuration of those logical switches.

The MPREs 1030 perform L3 routing on data packets received from a virtual port on the MPSE 1020. In some embodiments, this routing operation entails resolving L3 IP address to a next-hop L2 MAC address and a next-hop VNI (i.e., the VNI of the next-hop's L2 segment). Each routed data packet is then sent back to the MPSE 1020 to be forwarded to its destination according to the resolved L2 MAC address. This destination can be another VM connected to a virtual port on the MPSE 1020, or a reachable L2 network element on the physical network 1090 (e.g., another VM running on another host, a physical non-virtualized machine, etc.).

As mentioned, in some embodiments, a MPRE is a local instantiation of a logical routing element (LRE) that operates across the different host machines and can perform L3 packet forwarding between VMs on a same host machine or on different host machines. In some embodiments, a host machine may have multiple MPREs connected to a single MPSE, where each MPRE in the host machine implements a different LRE. MPREs and MPSEs are referred to as "physical" routing/switching element in order to distinguish from "logical" routing/switching elements, even though MPREs and MPSE are implemented in software in some embodiments. In some embodiments, a MPRE is referred to as a "software router" and a MPSE is referred to a "software switch". In some embodiments, LREs and LSEs are collectively referred to as logical forwarding elements (LFEs), while MPREs and MPSEs are collectively referred to as managed physical forwarding elements (MPFEs).

In some embodiments, the MPRE 1030 includes one or more logical interfaces (LIFs) that each serves as an interface to a particular segment (L2 segment or VXLAN) of the network. In some embodiments, each LIF is addressable by its own IP address and serve as a default gateway or ARP proxy for network nodes (e.g., VMs) of its particular segment of the network. In some embodiments, all of the MPREs in the different host machines are addressable by a same "virtual" MAC address (or vMAC), while each MPRE is also assigned a "physical" MAC address (or pMAC) in order indicate in which host machine does the MPRE operate.

The crypto engine 1075 applies encryption key to decrypt incoming data from the physical network and to encrypt outgoing data to the physical network 1090. In some embodiments, a controller sends the encryption key to the virtualization software 1005 through control plane messages, and the crypto engine 1075 identifies a corresponding key from among the received keys for decrypting incoming packets and for encrypting outgoing packets. In some embodiments, the controller agent 1040 receives the control plane messages, and the keys delivered by the control plane messages is stored in a key store 1078 that can be accessed by the crypto engine 1075.

The uplink module 1070 relays data between the MPSE 1020 and the physical NIC 1095. The uplink module 1070 includes an egress chain and an ingress chain that each performs a number of operations. Some of these operations are pre-processing and/or post-processing operations for the MPRE 1030. The operations of LIFs, uplink module, MPSE, and MPRE are described in U.S. patent application Ser. No. 14/137,862 filed on Dec. 20, 2013, titled "Logical Router", published as U.S. Patent Application Publication 2015/0106804.

As illustrated by FIG. 10, the virtualization software 1005 has multiple MPREs for multiple different LREs. In a multi-tenancy environment, a host machine can operate virtual machines from multiple different users or tenants (i.e., connected to different logical networks). In some embodiments, each user or tenant has a corresponding MPRE instantiation of its LRE in the host for handling its L3 routing. In some embodiments, though the different MPREs belong to different tenants, they all share a same vPort on the MPSE 1020, and hence a same L2 MAC address (vMAC or pMAC). In some other embodiments, each different MPRE belonging to a different tenant has its own port to the MPSE.

The MPSE 1020 and the MPRE 1030 make it possible for data packets to be forwarded amongst VMs 1011-1014 without being sent through the external physical network 1090 (so long as the VMs connect to the same logical network, as different tenants' VMs will be isolated from each other). Specifically, the MPSE performs the functions of the local logical switches by using the VNIs of the various L2 segments (i.e., their corresponding L2 logical switches) of the various logical networks. Likewise, the MPREs perform the function of the logical routers by using the VNIs of those various L2 segments. Since each L2 segment/L2 switch has its own a unique VNI, the host machine 1000 (and its virtualization software 1005) is able to direct packets of different logical networks to their correct destinations and effectively segregates traffic of different logical networks from each other.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 11:
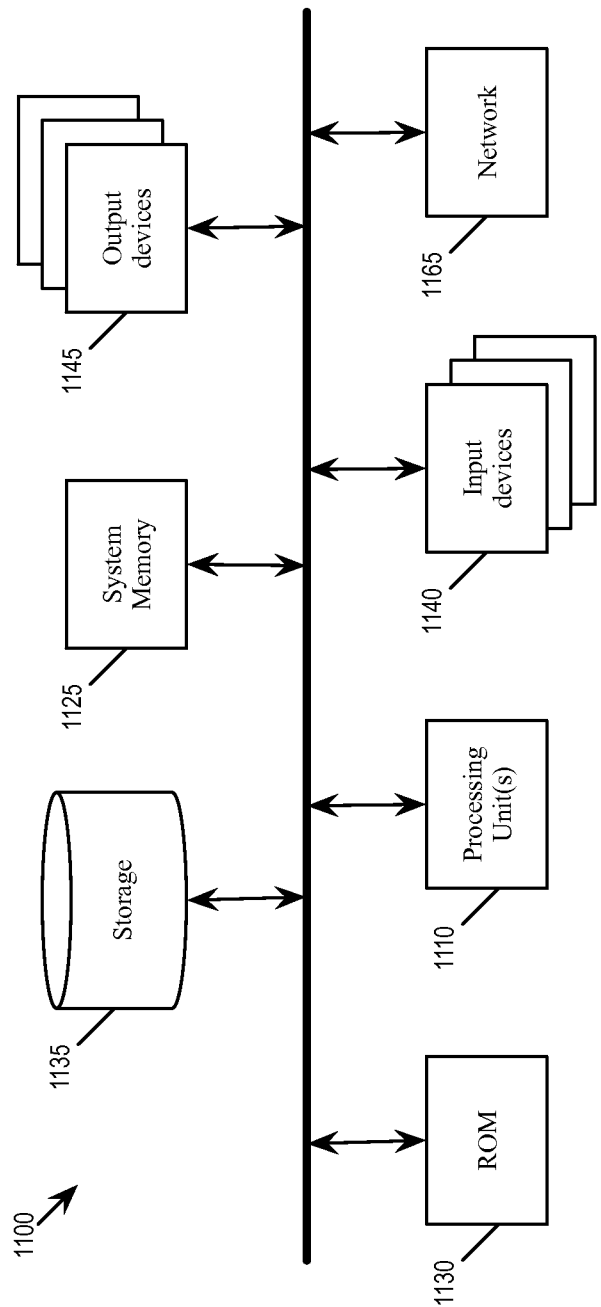
FIG. 11 conceptually illustrates an electronic system with which some embodiments of the invention are implemented.

FIG. 11 conceptually illustrates an electronic system 1100 with which some embodiments of the invention are implemented. The electronic system 1100 can be used to execute any of the control, virtualization, or operating system applications described above. The electronic system 1100 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1100 includes a bus 1105, processing unit(s) 1110, a system memory 1125, a read-only memory 1130, a permanent storage device 1135, input devices 1140, and output devices 1145.

The bus 1105 collectively represents all system, peripheral, and chipset buses that communicatively connect the numerous internal devices of the electronic system 1100. For instance, the bus 1105 communicatively connects the processing unit(s) 1110 with the read-only memory 1130, the system memory 1125, and the permanent storage device 1135.

From these various memory units, the processing unit(s) 1110 retrieves instructions to execute and data to process in order to execute the processes of the invention. The processing unit(s) may be a single processor or a multi-core processor in different embodiments.

The read-only-memory (ROM) 1130 stores static data and instructions that are needed by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the invention use a mass-storage device (such as a magnetic or optical disk and its corresponding disk drive) as the permanent storage device 1135.

Other embodiments use a removable storage device (such as a floppy disk, flash drive, etc.) as the permanent storage device. Like the permanent storage device 1135, the system memory 1125 is a read-and-write memory device. However, unlike storage device 1135, the system memory is a volatile read-and-write memory, such a random access memory. The system memory stores some of the instructions and data that the processor needs at runtime. In some embodiments, the invention's processes are stored in the system memory 1125, the permanent storage device 1135, and/or the read-only memory 1130. From these various memory units, the processing unit(s) 1110 retrieves instructions to execute and data to process in order to execute the processes of some embodiments.

The bus 1105 also connects to the input and output devices 1140 and 1145. The input devices enable the user to communicate information and select commands to the electronic system. The input devices 1140 include alphanumeric keyboards and pointing devices (also called "cursor control devices"). The output devices 1145 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 11, bus 1105 also couples electronic system 1100 to a network 1165 through a network adapter (not shown). In this manner, the computer can be a part of a network of computers (such as a local area network ("LAN"), a wide area network ("WAN"), or an Intranet, or a network of networks, such as the Internet. Any or all components of electronic system 1100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

In this document, the term "packet" refers to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 6 and 9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A system comprising:
a plurality of host computers providing computing and network resources, wherein a set of machines execute on each host computer and the machines are interconnected by an internal network; and
a set of edge nodes providing access to at least a group of machines from devices external to said internal network, said set of edge nodes connected to the machines in the group through the internal network;
wherein at least one particular edge node further dynamically negotiates an encryption key for a connection session with a particular device external to the internal network, said encryption key for encrypting a set of outgoing packets (i) generated and sent by a particular machine executing on a particular host computer and (ii) destined to the particular external device,
wherein after negotiating the encryption key for the connection session, the particular edge node provides the negotiated encryption key to said particular host computer so that the set of outgoing packets are encrypted on the particular host computer by using the negotiated encryption key.

2. The system of claim 1, wherein the set of edge nodes comprises a plurality of edge nodes for forwarding outgoing packets generated by the group of machines to the particular external device.

3. The system of claim 1, wherein the internal network is provided by a first datacenter, wherein the particular external device is a host computer in a remote network that is provided by a second datacenter.

4. The system of claim 1, wherein the negotiated encryption key is further for decrypting a set of incoming packets from said particular external device to said particular machine executing on the particular host computer.

5. The system of claim 4, wherein the set of incoming packets and the set of outgoing packets belong to the connection session.

6. The system of claim 4, wherein the set of incoming packets and the set of outgoing packets belong to a same L2 segment.

7. A system comprising:
a plurality of host computers providing computing and network resources, wherein a set of machines execute on each host computer and the machines are interconnected by an internal network; and a set of edge nodes providing access to at least a group of machines from devices external to said internal network, said set of edge nodes connected to the machines in the group through the internal network, wherein at least one particular edge node further negotiates an encryption key for encrypting a set of outgoing packets (i) generated and sent by a particular machine executing on a particular host computer and (ii) destined to a particular device external to said internal network, wherein the particular edge node further provides the negotiated encryption key to said particular host computer so that the set of outgoing packets are encrypted on the particular host computer by using the negotiated encryption key, and wherein the particular edge node further negotiates a plurality of encryption keys for a plurality of different sets of outgoing packets from the set of machines.

8. The system of claim 7, wherein the particular edge node receives an incoming encrypted packet and decrypts a portion of the incoming encrypted packet by identifying a negotiated key for decrypting the incoming encrypted packet based on information stored in a header of the incoming encrypted packet.

9. The system of claim 7, wherein the system further comprises a controller for receiving the negotiated encryption key from the particular edge node and distributing the negotiated encryption key to the particular host computer.

10. The system of claim 7, wherein the plurality of host computers implements a plurality of distributed logical forwarding elements, and wherein the system further comprises at least one controller for providing configuration data to host computers to configure the distributed logical forwarding elements.

11. A particular computer serving as one of a plurality of host computers in a datacenter, the particular computer comprising:

a set of processing units; and a set of machines executing on the processing units that transmit a plurality of different sets of outgoing packets; and a machine readable medium storing a program for execution by at least one of the processing units, the program comprising sets of instructions for:

receiving a plurality of encryption keys from an edge node within a datacenter, wherein the edge node negotiated the plurality of encryption keys for encrypting the plurality of sets of outgoing packets generated and sent by a plurality of machines executing on the particular computer;

selecting an encryption key for encrypting a particular set of outgoing packets (i) generated and sent by a particular machine executing on the particular computer and (ii) destined to a particular device external to the datacenter; and using the selected encryption key to encrypt the particular set of outgoing packets destined to the particular device.

12. The particular computer of claim 11, wherein the datacenter is a first datacenter, wherein the particular external device is a host computer in a remote network that is provided by a second datacenter.

13. The particular computer of claim 11, wherein the selected encryption key is further for decrypting a set of incoming packets from said particular external device to said particular machine executing on the particular computer.

14. The particular computer of claim 13, wherein the set of incoming packets and the particular set of outgoing packets belong to a particular L4 connection.

15. The particular computer of claim 13, wherein the set of incoming packets and the particular set of outgoing packets belong to a same L2 segment.

16. The particular computer of claim 11, wherein the set of machines comprises a plurality of virtual machines (VMs) that transmit the plurality of different sets of outgoing packets.

17. A method comprising:

negotiating, at an edge node within a datacenter that comprises a plurality of host computers, an encryption key for encrypting a set of outgoing packets (i) generated and sent from a first machine executing on a first host computer and (ii) destined to a particular device external to the datacenter;

providing the negotiated encryption key to the first host computer for encrypting the set of outgoing packets on the first host computer by using the negotiated encryption key;

receiving, at the edge node, an incoming encrypted packet and decrypting a portion of the incoming encrypted packet based on information stored in a header of the incoming encrypted packet;

using the decrypted portion of the incoming encrypted packet to identify a destination second machine executing on a second host computer; and forwarding the incoming encrypted packet to the identified destination second machine.

18. The method of claim 17, wherein the negotiated encryption key provided to the first host computer is further for the first host computer to decrypt a set of incoming packets from the particular external device.

19. The method of claim 17 further comprising negotiating a plurality of encryption keys for a plurality of different sets of incoming packets.

20. The method of claim 19 wherein decrypting a portion of the incoming encrypted packet further:

comprises using the stored header information to identify a second negotiated encryption key for decrypting the incoming encrypted packet.

* * * * *